(12) United States Patent
Brehob et al.

(10) Patent No.: US 7,934,725 B2
(45) Date of Patent: May 3, 2011

(54) VEHICLE SYSTEM AND METHOD FOR ACCESSING DENIED TERRAIN

(75) Inventors: Wayne Miller Brehob, Dearborn, MI (US); Douglas Christopher MacKenzie, Livonia, MI (US)

(73) Assignee: Mobile Intelligence Corporation, Livonia, MI (US)

( * ) Notice: Subject to any disclaimer, the term of this patent is extended or adjusted under 35 U.S.C. 154(b) by 442 days.

(21) Appl. No.: 11/767,408

(22) Filed: Jun. 22, 2007

(65) Prior Publication Data

US 2008/0314656 A1    Dec. 25, 2008

Related U.S. Application Data

(63) Continuation-in-part of application No. 11/214,378, filed on Aug. 29, 2005, now abandoned.

(51) Int. Cl.
*B60S 9/22* (2006.01)
*B60G 17/0165* (2006.01)

(52) U.S. Cl. ........ 280/5.517; 180/8.3; 180/8.2; 280/5.3; 280/6.157; 280/6.159; 280/5.514; 280/5.518

(58) Field of Classification Search .................. None
See application file for complete search history.

(56) References Cited

U.S. PATENT DOCUMENTS

| | | | | |
|---|---|---|---|---|
| 4,960,290 A | * | 10/1990 | Bose | 280/124.162 |
| 4,981,309 A | * | 1/1991 | Froeschle et al. | 280/6.157 |
| 4,991,698 A | * | 2/1991 | Hanson | 188/380 |
| 5,273,296 A | | 12/1993 | Lepek | |
| 5,957,252 A | | 9/1999 | Berthold | |
| 6,000,702 A | * | 12/1999 | Streiter | 280/5.507 |
| 6,086,060 A | | 7/2000 | Berthold | |
| 6,223,108 B1 | * | 4/2001 | Izawa et al. | 701/36 |
| 6,548,982 B1 | | 4/2003 | Papanikolopoulos et al. | |
| 6,589,098 B2 | | 7/2003 | Lee et al. | |
| 6,945,541 B2 | * | 9/2005 | Brown | 280/5.507 |
| 2003/0137268 A1 | | 7/2003 | Papanikolopoulos et al. | |

OTHER PUBLICATIONS

Video search in youtube.com search "bose actuve suspension", video is in URL http://www.youtube.com/watch?v=eSi6J-QK1Iw dated May 24, 2007.*

* cited by examiner

*Primary Examiner* — Paul N Dickson
*Assistant Examiner* — Marlon A Arce (57) ABSTRACT

A surface vehicle capable of overcoming obstacles is disclosed in which the vehicle accelerates vertically while having a horizontal velocity. The vehicle has a frame and at least three wheels attached to the frame to which a horizontal propulsion system is coupled. Further, a vertical propulsion system is coupled to the frame and the wheels. The vertical propulsion system is capable of providing a force to such wheels normal to the surface so that the vehicle separates from the surface. The vehicle has an electronic control unit coupled to the vertical propulsion system to automatically control its operation.

29 Claims, 10 Drawing Sheets

Vertical acceleration and height during a jump

VEHICLE SYSTEM AND METHOD FOR ACCESSING DENIED TERRAIN

CROSS-REFERENCE TO RELATED APPLICATIONS

This application is a continuation-in-part of published application US2007/0045012A1, Ser. No. 11/214,378, filed Aug. 29, 2005 and published Mar. 1, 2007 now abandoned.

FIELD OF THE INVENTION

The present invention relates to a vehicle capable of overcoming obstacles such as fences, ledges, boulders, rivers, and ditches. In particular, the vehicle accelerates vertically while having a horizontal velocity.

BACKGROUND OF THE INVENTION

A surface vehicle is a device that transports itself and a payload from place to place on the surface of the earth or other celestial body. Such vehicles can lose their mobility when encountering obstacles: positive obstacles which stick up from the average surface, such as logs, boulders, fences; negative obstacles such as holes, ledges, or ditches; and non-supportive surfaces such as rivers, ponds, or swamp muck. The inventors of the present invention have recognized that it would be desirable to have a surface vehicle which is not limited by such obstacles.

Prior art vehicles, such as motorcycles, are capable of overcoming obstacles; however, they require a ramp to impart a vertical component of velocity. This is impractical for free roaming vehicles for which it is desirable to overcome any obstacle encountered regardless of the presence of a ramp.

A prior art vehicle capable of imparting a vertical acceleration to the vehicle is a low rider, in which hydraulic cylinders are energized to cause the vehicle to rise and fall. There are several disadvantages of a low rider vehicle for the purpose of traversing an obstacle. Typically, not all wheels of the low rider leave the ground, or if they do, either the rear or front wheels leave the ground only a small distance. The low rider does not provide sufficient acceleration to cause the vehicle to leave the ground an appreciable distance with a single actuation of the hydraulic cylinders. Instead, the cylinders are bounced at a resonant frequency to cause the vehicle to attain a significant vertical height with multiple actuations of the hydraulic cylinders. Such operation does not allow a low rider vehicle to clear an obstacle. Additionally, the control of the hydraulic cylinders is controlled remotely by a human operator. Moreover, the low rider is not adapted to provide significant vertical acceleration when the vehicle is translating on the ground. Instead, the highest vertical heights are achieved when the vehicle is not translating. Yet another disadvantage for the low rider in overcoming a positive obstacle is that the wheels are actuated in a downward direction to cause the vehicle to accelerate upward. With the wheels at their lowest extent possible, they would be the limiting factor for such a vehicle in clearing a positive obstacle.

Rockets and jet propulsion are used to generate vertical acceleration in known devices. However, both require a large amount of energy to provide the acceleration. Although they might be used to clear one or a few obstacles, they are impractical for clearing multiple obstacles that a vehicle might encounter simply because the fuel needs are too great.

SUMMARY OF THE INVENTION

Disadvantages of prior art surface vehicles are overcome by a surface vehicle system having a frame, at least three members coupled to the frame, and a horizontal propulsion system coupled to the frame. The horizontal propulsion system provides motive force to at least one of the members to cause the vehicle to translate along the surface. The vehicle further includes a vertical propulsion system coupled to the frame and the members, which is capable of providing a force to the members generally normal to the surface to cause all members to lift off the surface. The force is sufficient to generate a vertical vehicle velocity to cause said members to separate from the surface. In one embodiment such vertical velocity is at least 1.5 m/sec. The vehicle includes an electronic control unit coupled to the vertical propulsion system to automatically control operation of the vertical propulsion system. In one embodiment, the members are wheels. In an alternative embodiment, the members are tracks.

In one embodiment, the vertical propulsion system includes a hydraulic cylinder capable of developing a large, controlled vertical force between the members in contact with the ground and the body of the vehicle for sufficient time to accelerate the vehicle in a substantially vertical direction to launch it free of the surface. The vertical force is applied while the vehicle is at a controlled speed horizontally. Thereby, the vehicle can be propelled over an obstacle. The vertical force is sufficient to cause the vehicle to attain more than 2 gs of acceleration such that it lifts from the surface. The term 'g' refers to the acceleration of gravity, which is 9.8 m/s$^2$ for earth. This gravitational constant is different for alternative celestial bodies.

An advantage of the present invention is that by causing the vehicle to translate in a vertical direction with a velocity of at least 1.5 m/sec, the vehicle is caused to leave the surface.

By being separated from the surface for a period of time during which the vehicle moves a controlled distance horizontally, the vehicle returns to the surface having traversed the obstacle. Since it does this without recourse to aerodynamic lift, yet another advantage of the present invention is that the vehicle doesn't need large surfaces that make the vehicle wide, or rocket propulsion that is too energy intensive to be practical for a vehicle without a long duration mission.

Yet another advantage of the present invention is in evasive maneuvers. Should there be a moving obstacle, such as another vehicle in the vicinity that is out of control, the vehicle of the present invention can provide a higher acceleration rate vertically than the less than 1 g acceleration rate that can be generated horizontally. Thereby, a collision with an errant vehicle or other moving mass can be avoided by jumping upward.

Another advantage of the present invention is that the vehicle can be accelerated vertically in a single actuation without the need for a ramp, as required by jumping cars or motorcycles, or an energy-intensive rocket propulsion device.

A method is also disclosed for operating a vehicle in which a vertical propulsion device is actuated. The vertical propulsion device is coupled between a frame of the vehicle and members in contact with the ground. The actuation of the vertical propulsion device causes the members to apply a substantially normal force of sufficient magnitude to the surface that the resulting acceleration of the vehicle is greater than 2 gs. The entire vehicle lifts off the ground by a single actuation of the vertical propulsion device. The method further includes retracting the wheels toward the frame after the members are no longer in contact with the ground, particularly in clearing a positive obstacle. Further, the members are extended away from the frame after the vehicle has cleared the positive obstacle and before the vehicle impacts the ground. In one alternative, the propulsion device is a hydraulic cylinder. A valve in the hydraulic cylinder is adjusted to provide damping as the vehicle impacts the surface.

In another alternative, the vertical propulsion device is an internal combustion cylinder. Each member is equipped with a vertical propulsion device. In such an embodiment, the vehicle may have one conventional internal combustion engine to provide the motive force in the horizontal direction and an internal combustion cylinder mounted on each member. These internal combustion cylinders mounted on each member are known and are used in nail guns and pile drivers, as examples. Conventional internal combustion engines are adapted to provide rotary output and the internal combustion cylinder mounted on each member provides linear output.

In one embodiment, the members are wheels and the vehicle includes a horizontal propulsion device, which applies a torque to rotate at least one of the wheels to cause the vehicle to translate along the ground.

The method also includes detecting an obstacle over which the vehicle cannot travel if it remains substantially in contact with the ground. In response to detecting the obstacle, a signal is provided to actuate the vertical propulsion device. The detection is inputted to and the actuating signal is provided by an onboard electronic controller electronically coupled to the vertical propulsion device. The horizontal propulsion device is also electronically coupled to the electronic control unit. The electronic controller commands the horizontal propulsion system to actuate the horizontal propulsion device to attain a predetermined translational velocity prior to actuating the vertical propulsion device so that the vehicle clears the obstacle. The obstacle is a positive obstacle, a negative obstacle, or a non-supportive surface.

The method described in the present invention allows determination of whether the vehicle can clear the obstacle prior to actuating the vertical propulsion device, thereby mitigating a collision with the obstacle. If it is determined that the obstacle could be cleared if the vehicle had a higher translational velocity, the vehicle can approach the obstacle for a second time after having attained that higher velocity. If it is determined that the obstacle cannot be cleared, the vehicle is commanded to find a more favorable location. In one alternative, a test of surface condition is made to determine whether the surface is sufficiently stable to support the applied downward force of the members to accelerate the vehicle vertically. This is done by sensing the reaction of the vehicle and members to a known pulse of the vertical propulsion system.

Other features and advantages of the present invention will be apparent from the accompanying drawings, and from the detailed description that follows below

BRIEF DESCRIPTION OF THE DRAWINGS

The invention will now be described further by way of example only and with reference to the accompanying drawings in which.

DETAILED DESCRIPTION

Figure 1:
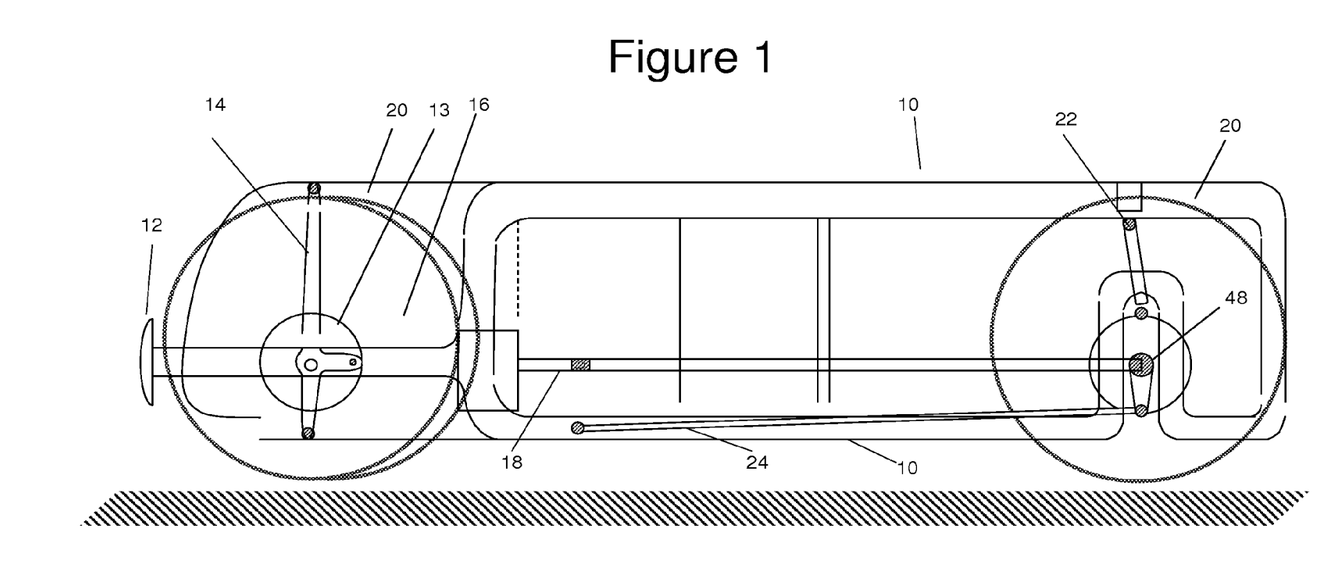
FIG. 1 is an elevation schematic of a jumping vehicle according to an aspect of the present invention.
Figure 2:
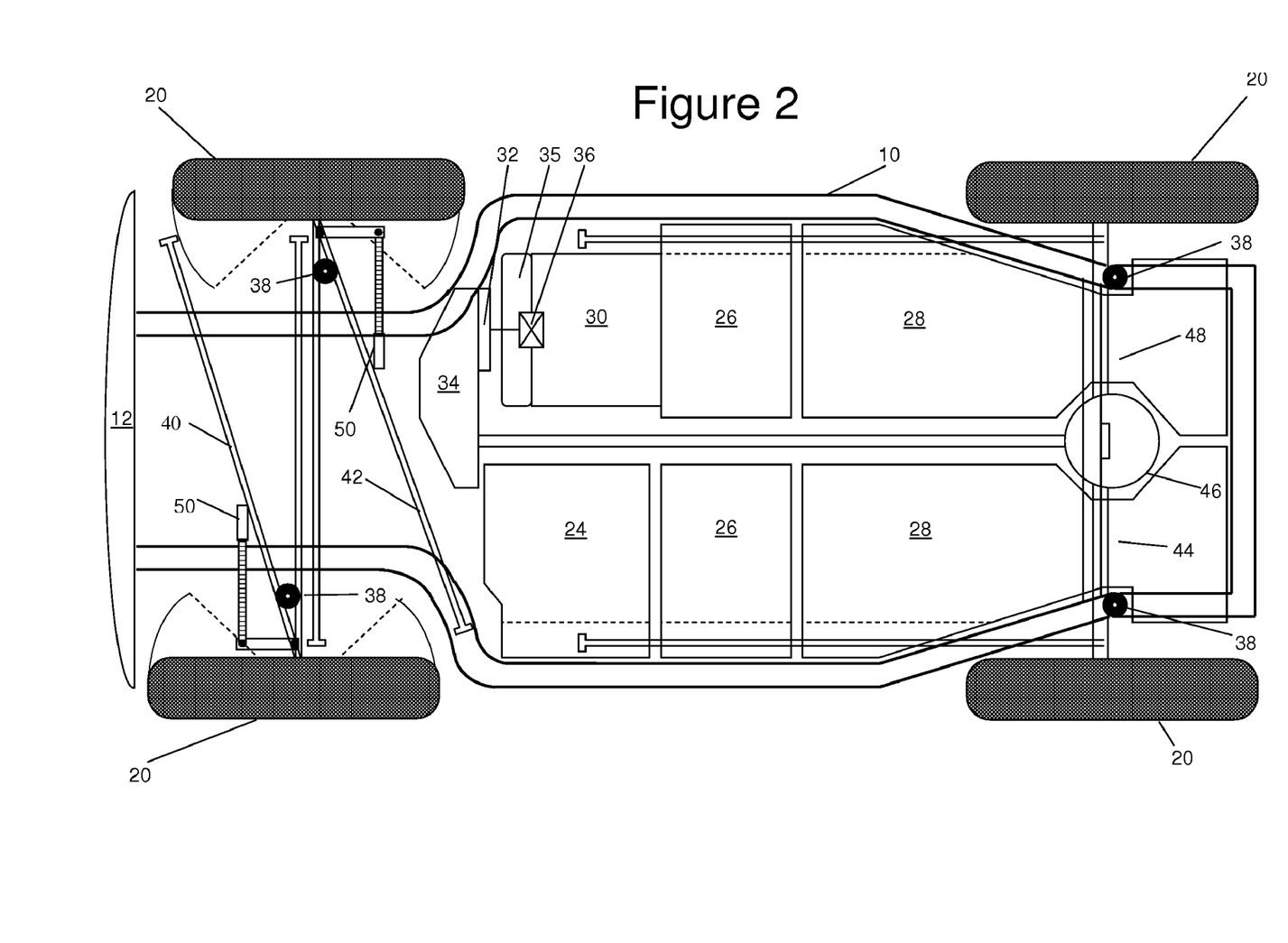
FIG. 2 is a plan schematic of a jumping vehicle according to an aspect of the present invention in which an example of a horizontal propulsion system is shown.

A vehicle according to the present invention is shown in FIGS. 1 and 2, FIG. 1 being an elevation view and FIG. 2 being a plan view. The vehicle has a frame 10 to which three or more members are connected. In the present example, there are 4 members and the members are wheels 20. The front wheels are connected to the frame by A-arms: the left front wheel via A-arm 40 and the right front wheel via A-arm 42 (shown in FIG. 2 only). The left hand front wheel is slightly forward of the right hand left wheel to accommodate A-arms 42 being in a plane without contacting each other. Also, A-arm 42 connected to the right hand wheel angles toward the rear of the vehicle and A-arm 42 connected to the left hand wheel angles toward the front of the vehicle. The rear wheels are mounted on a solid axle 48 connected to frame 10 by radius arms 24 and lateral control link 22. Steering of the front wheels is accomplished by linear actuators 50 mounted to A-arms 40, 42 and connected to steering knuckles 13. Steering knuckles 13 are attached to the front knuckles on which wheel spindles are mounted. The vehicle is propelled horizontally, i.e., along the surface, by an engine 30, which in one embodiment is an internal combustion engine, gasoline or diesel. Engine 30 is coupled to a motor generator 35 via a dog clutch 32. The shaft from motor generator 35 is connected to a transmission 34 through a clutch 32. Transmission 34 is connected to driveshaft 18 which connects to the differential 46 in rear axle 48 which drives the rear wheels 20. The drivetrain shown in FIGS. 1 and 2 is a hybrid configuration. In a non-hybrid embodiment, engine 30 connects to transmission 34 through clutch 32. Both embodiments of the vehicle use a battery 24. A higher capacity battery is used for the hybrid application. A battery for a non-hybrid version is sized to start engine 30 and to supply any onboard accessories.

The horizontal propulsion system may be a steam engine, a Stirling cycle engine, a gas turbine engine, a reciprocating internal combustion engine, such as a gasoline engine (often referred to as Otto cycle), a diesel engine, and variants including: 2-stroke, 4-stroke, homogeneous charge compression ignition or any other known type.

Figure 3:
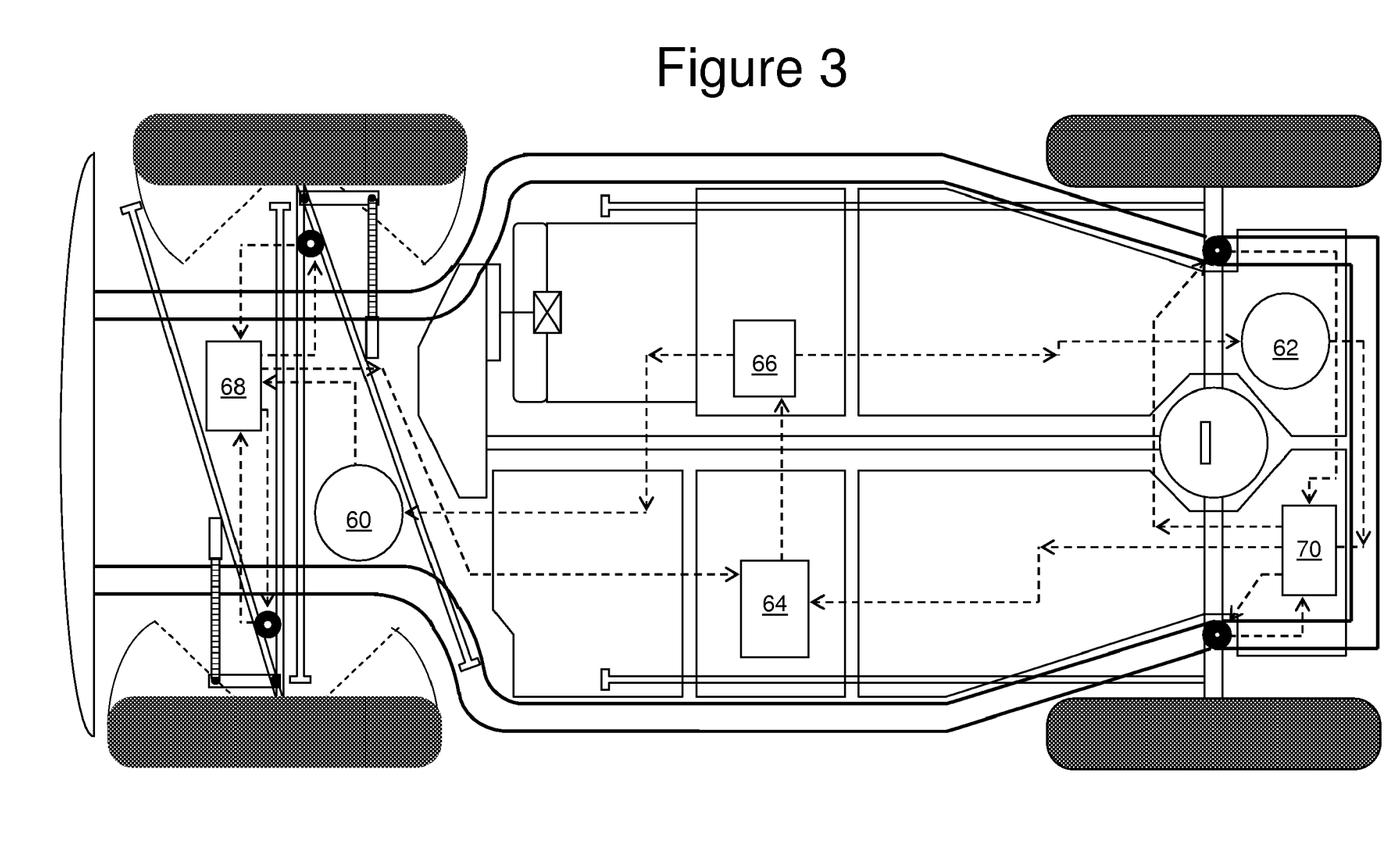
FIG. 3 is a plan schematic of a jumping vehicle according to an aspect of the present invention in which an example of a vertical propulsion system operated hydraulically is shown.

Referring now to FIG. 3, an embodiment of a hydraulic vertical propulsion system is shown. The hydraulic vertical propulsion system is also included in the vehicle shown in FIGS. 1 and 2. However, for the sake of simplicity, the mechanical and hydraulic systems are highlighted separately in the two views. The hydraulic system includes a hydraulic fluid reservoir 64 which supplies hydraulic fluid to hydraulic pump 66. Hydraulic pump 66 is driven off engine 30. In another embodiment, an electric motor is used to drive pump 66. High pressure hydraulic fluid is supplied to accumulators, front 60 and rear 62. In an alternate embodiment, a single accumulator could be used. The front accumulator 60 is connected to the front hydraulic control valve 68; similarly, accumulator 62 is connected to rear hydraulic control valve 70. The hydraulic control valves supply hydraulic fluid to the vertical propulsion cylinders 38 or hydraulic struts. The lines between the hydraulic control valves and the vertical propulsion cylinders 38 connect to both ends of the vertical propulsion cylinders 38: supplying fluid to one end of vertical propulsion cylinder 38 causes wheels 20 to extend from frame 10 and supplying fluid to the other end of vertical propulsion cylinder 38 causes wheels 20 to retract toward frame 10. Hydraulic fluid return lines connect from vertical propulsion cylinders 38 to reservoir 64.

If the terrain over which vehicle 8 is traveling is uneven, it is desirable to have independent control of each wheel. As shown in FIG. 3, front wheels 20 have control valve 68 and rear wheels have control valve 70, which can be independently controlled. In an alternate embodiment, vehicle 8 is equipped with a control valve for each wheel.

To aid in understanding the invention, some design target data are provided. With a vehicle mass of 600 lbm, each of 4 corners carries 150 lbm. Due to a lever ratio of 3:1, the force required at each hydraulic cylinder is 450 lbf at one g. To accelerate at 4 gs, the force required is 1800 lbf. The pressure in the hydraulic cylinder, when the cylinder has a diameter of 1" or a cross-sectional area of 0.785 sq. in., is approximately 2300 psi.

The height that the vehicle achieves is velocity squared divided by (2*g). If the vehicle achieves a vertical velocity of 1.5 m/sec, the vehicle would achieve a height of about 0.1 m. At a vertical velocity of 3 m/3, it achieves about 0.4 m.

Figure 4A:
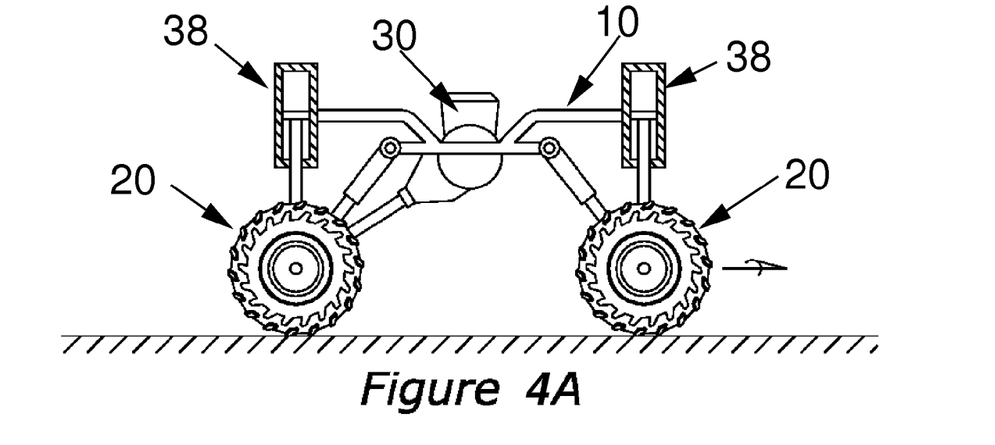
FIGS. 4A-I illustrate of a jump sequence for a jumping vehicle in overcoming a positive obstacle.
Figure 4B:
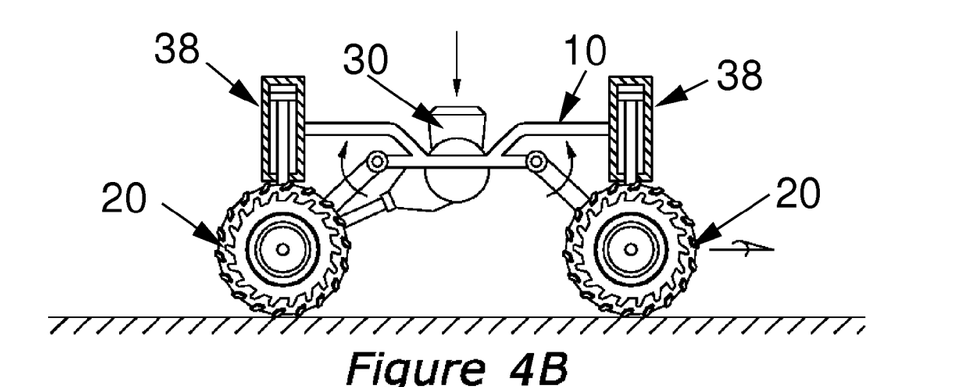
Figure 4C:
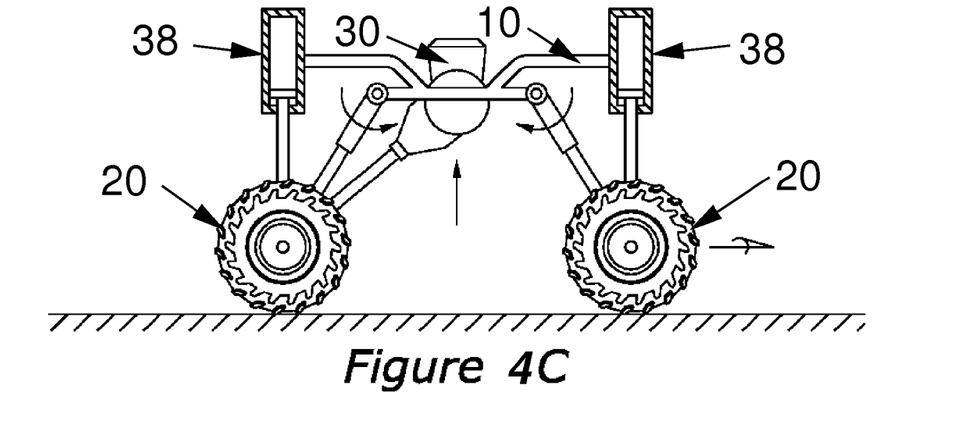
Figure 4D:
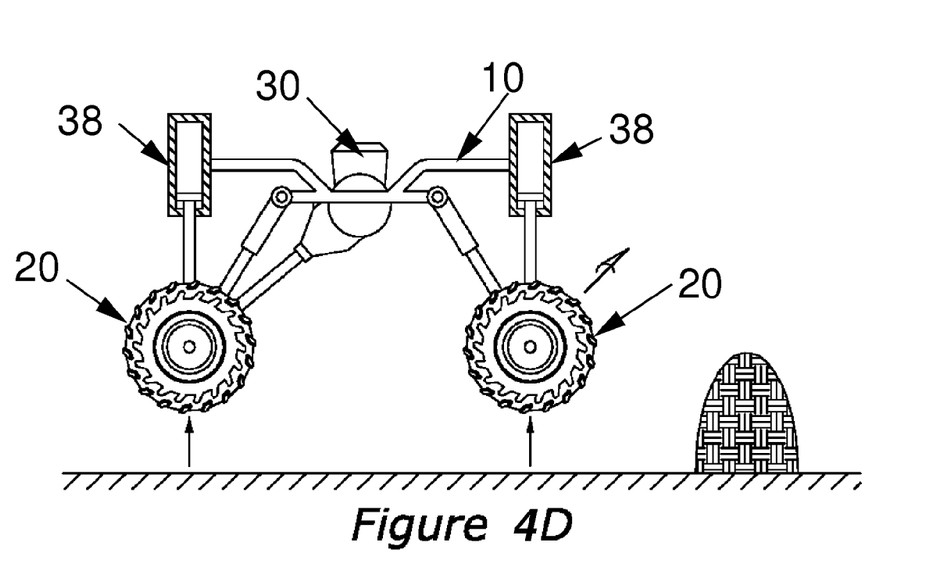
Figure 4E:
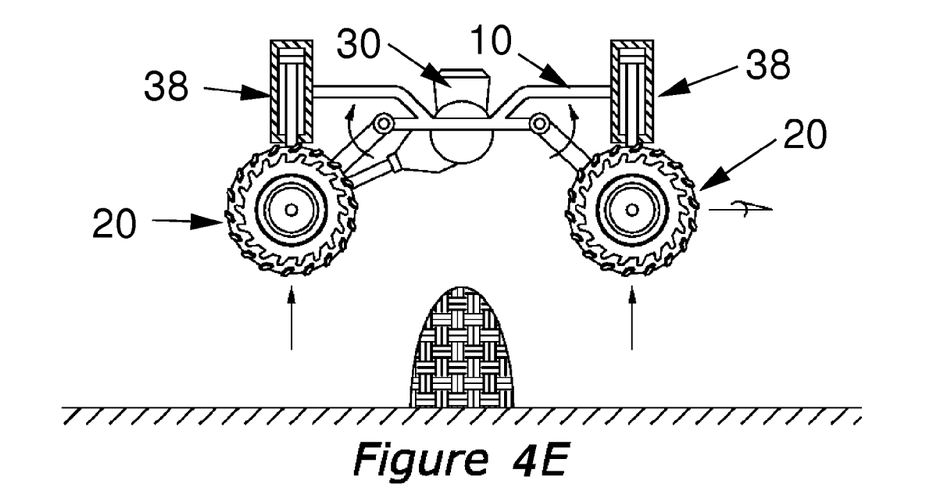

Referring now to FIGS. 4A-I, the phases of a jump over a positive obstacle are shown. Vehicle 8 is traveling normally in phase A, in which the suspension is not fully retracted to allow for ground clearance of the vehicle. Vehicle 8 translates along the surface at a forward velocity of 20 kilometers per hour (kph). In preparation for a jump, wheels 20 are retracted to cause vehicle 8 to hunker down toward ground 6, as shown in phase B (FIG. 4B). The vertical propulsion system is actuated causing wheels 20 to exert a downward force toward ground 6 forcing wheels 20 to separate from frame 10. In reaction, vehicle 8, is accelerated vertically, and rises, shown as phase C (FIG. 4C). While wheels 20 are in contact with surface 6, as shown in phase C, they continue to exert a downward force. When vehicle 8 reaches the limit of the suspension travel, wheels 20 lift off the ground as they are carried up with vehicle 8. Phase D shows a time after wheels 20 have come off ground 6 and remain extended. To clear obstacle 4, wheels 20 are retracted toward vehicle 8, as shown in phase E. After clearing obstacle 4, wheels 20 can be extended from vehicle 8 to prepare for touchdown, as shown in phase F. In phase G (FIG. 4G), wheels 20 of vehicle 8 have contacted ground 6. In phase H, the suspension has compressed to cushion the landing with ground 6. In phase I, the suspension is extended to achieve its standard ground clearance.

Figure 4F:
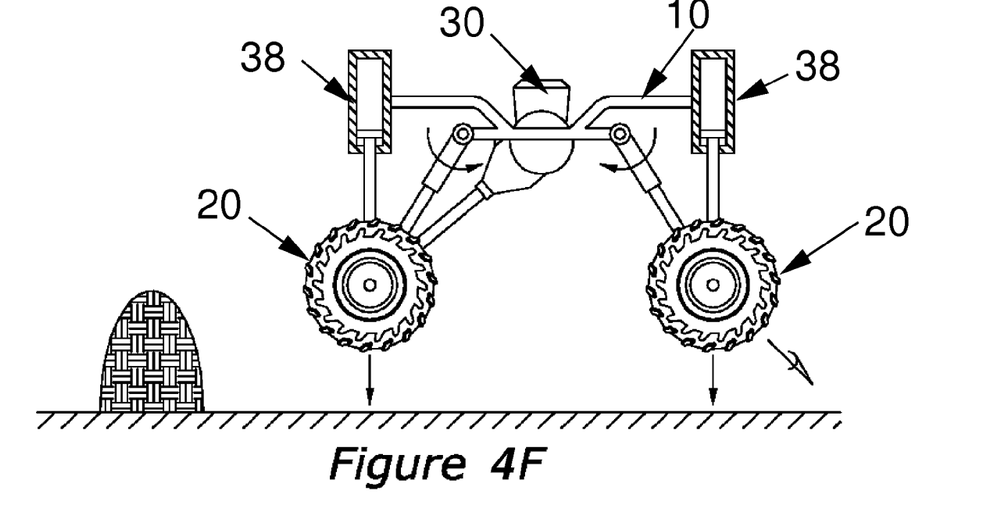
Figure 4G:
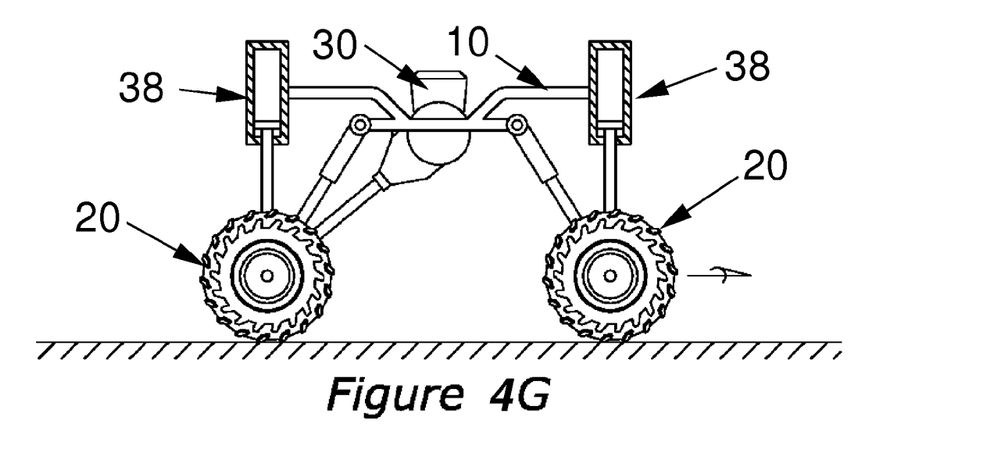
Figure 4H:
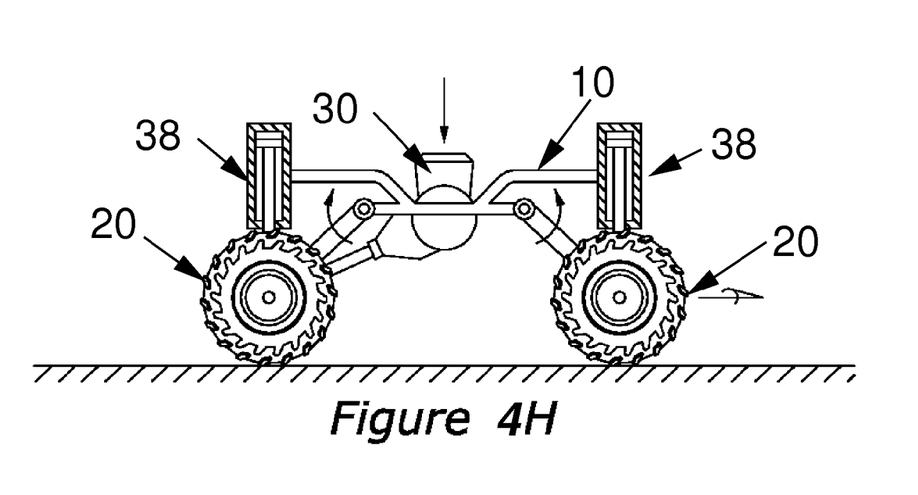
Figure 4I:
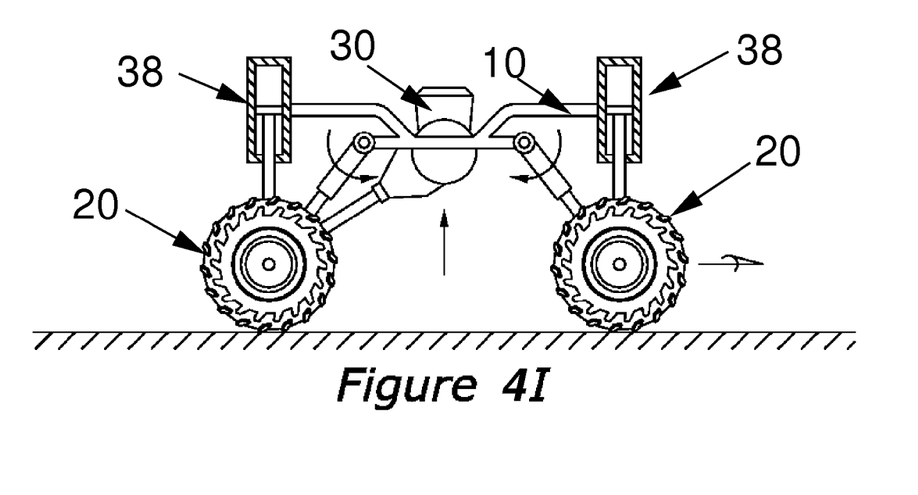

In the event that the obstacle being traversed is a negative obstacle, such as a chasm, or a neutral obstacle such as a ravine, vehicle 8 proceeds as shown in FIGS. 4A-I, except that in phase E, there is no need to retract the wheels. It is better not to retract the wheels to save the energy that would otherwise be expended in retracting and then later lowering the wheels in phase F (FIG. 4F). In this case, the vehicle reaches the apogee of the jump in phase E; however, the relative position of vehicle 8 and the wheels remains nearly constant through phase D through F.

Figure 6:
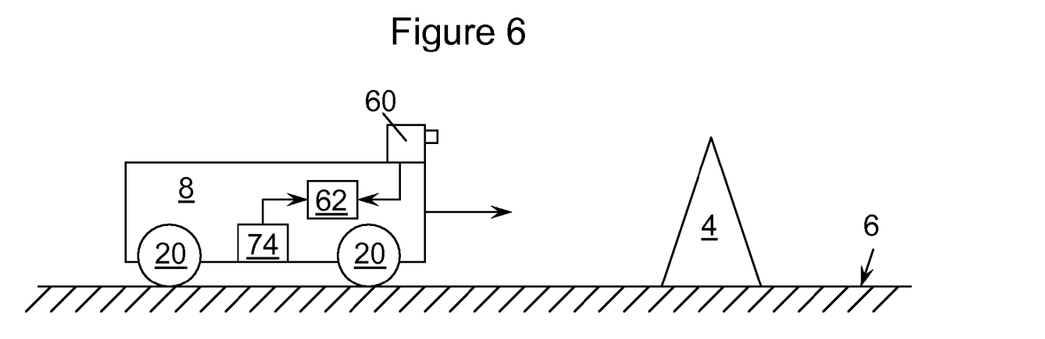
FIG. 6 is a schematic of a jumping vehicle according to an aspect of the present invention.

In FIG. 6, vehicle 8 is moving in the direction of obstacle 4. Vehicle 8 is equipped with electronic control unit 62, which is in communication with image capture unit 62 and sensors 74. Images from unit 62 can be analyzed to determine that vehicle 8 is approaching an obstacle. Sensors 74 can include various sensors which can be used to infer the condition of surface 6. Sensors 74 can act from a distance by measuring radiative properties of the surface, surface irregularities, as a couple of examples. Sensors 74 can have an extendable arm (not shown) which can be used to impact surface 6 to determine its ability to support members 20 in making a jump. In one embodiment, sensors 74 collect a small amount of soil from surface 6 and make an onboard determination of the properties of surface 6.

Figure 7:
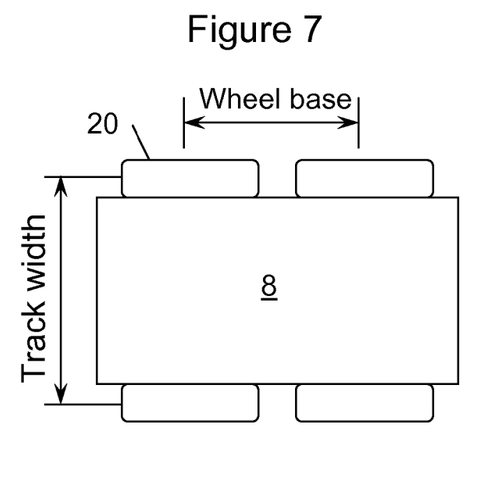
FIG. 7 is a schematic of a plan view of the vehicle showing wheel base and track width.

In FIG. 7, the wheel base and track width are shown in a plan view of vehicle 8.

Although not shown in the figures, electronic control unit 62, or another electronic control unit similar to unit 62 is electronically coupled to both the vertical and horizontal propulsion systems to actuate hydraulic cylinders 38, control arms 40 and 42, and engine 30. Electronic control unit obtains information from engine 30, sensors 74 (providing, for example but not limited to, ambient condition signals, fuel signals, vehicle payload signals, vehicle condition signals such as relative position of frame 10 with respect to wheels 20) sensors associated with the vertical propulsion system, sensors associated with the steering mechanism, etc. From these signals, engine 30 controls the vertical propulsion system, the horizontal propulsion system, and the steering mechanism of vehicle 8 to allow it to traverse terrain which would otherwise be unattainable for vehicle 8.

Figure 5:
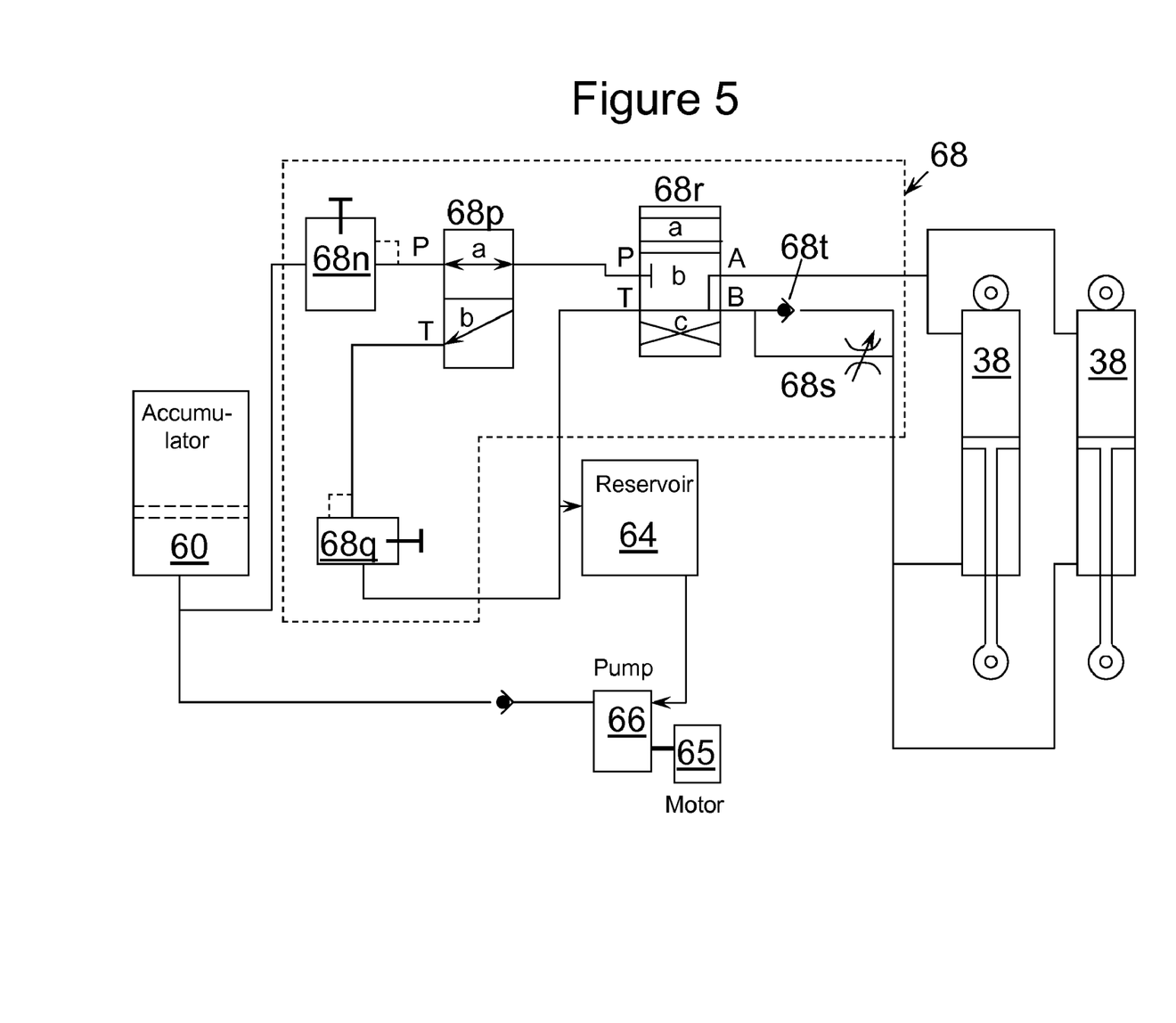
FIG. 5 is a schematic of a hydraulic system according to an aspect of the present invention.

Referring now to FIG. 5, the hydraulic system is shown in schematic form with the control in the position for normal horizontal translation, i.e., no vertical acceleration, in which the hydraulic cylinders act as shock absorbers. In FIG. 1, the control valve is shown as an integrated single unit. In FIG. 5, the control valve detail is shown. Control valve 68 includes pressure regulations 68$n$ and 68$q$. It also has a 2-position control valve 68$p$ and a 3-position control valve 68$r$. In one embodiment, control valve 68 also includes check valve 68$t$ and variable restrictor 68$s$. Alternatively, 68$t$ and 68$s$ are not included. The unpressurized hydraulic fluid resides in reservoir 64. Pump 66 draws from reservoir 64 and pressurizes the fluid against the pressure in accumulator 60. In FIG. 5, pump 8 is driven by electric motor 65. However, this is not intended to be limiting; pump 8 could be driven by engine 30 or any other known power source. Two hydraulic cylinders 38 are shown in FIG. 5 by way of example attached to the front and left front wheels.

Two-position valve 68$p$ has 3 ports, labeled P, A, and T in FIG. 5. When valve 68$p$ is in position a, port P communicates with port A. When valve 68$p$ is in position b, port A communicates with port T.

Three-position valve 68$r$ has 4 ports, labeled P, T, A, and B in FIG. 5. When valve 68$p$ is in position a, port P communicates with port A and port T communicates with port B. When valve 68$p$ is in position b, port P is deadended, and ports A, B, and T are in communication. When valve 68$p$ is in position c, port P communicates with port B and port T communicates with port A.

Starting in FIG. 5, because hydraulic cylinders 38 are acting as shock absorbers, valve 68$p$ is in a straight through position (denoted as position a) connecting accumulator 60 with the P port on valve 68$r$. Valve 68$r$ is in position b so that the P port is deadended, which prevents high pressure fluid from reaching hydraulic cylinders 38. The connection between ports A, B, and T of valve 68$r$ allow hydraulic cylinders 38 to act as shock absorbers allowing the vehicle suspension to operate on the springs.

When a jump command is received, valve 68$r$ is commanded to position c to send high pressure fluid to the lower end of hydraulic cylinders 38 to retract the wheels thereby causing the vehicle to be lowered to the ground in preparation for a jump. Note that valve 68$p$ does not change position.

Next in the jump sequence, valve 68$r$ is commanded to position a to send high pressure fluid to the upper end of hydraulic cylinders 38 and fluid from the low end of hydraulic cylinders 38 is vented and allowed to return back to reservoir 64. High pressure fluid acts on the pistons within hydraulic cylinders 38 to cause them to extend. This causes the vehicle to accelerate upward and moves vertically with respect to the wheels. When the limit of suspension travel is reached, the inertia of the sprung mass pulls the wheels free of the surface.

When the vehicle and wheels are airborne, the vehicle is prepared for landing by shifting valve 68*p* to position b while valve 68*r* remains in position a. As soon as the wheels start to contact the ground, the force on the tires increases which increases the force on hydraulic cylinders 38. The fluid from the top of hydraulic cylinder 38 discharges back through pressure regulator 68*q* to control the force during landing to avoid damage to the suspension by absorbing the energy before using all the suspension travel.

After the landing, valve 68*r* returns to the b position so that the suspension operates normally on the springs. Shortly after valve 68*r* is returned to position b, valve 68*p* is returned to position a.

In FIG. 1, it is shown that there is an accumulator 60 at the front of the vehicle and an accumulator 62 at the rear of the vehicle. Also, there is shown a hydraulic control valve 68 at the front of the vehicle and hydraulic control valve 70 at the rear of the vehicle. A similar system, as shown in FIG. 5 can be envisioned for the rear of the vehicle. The various hydraulic components can be integrated in alternative manners without departing from the scope of the invention. For example, two hydraulic pumps could be used to drive each accumulator. Or in another alternative, a single accumulator could supply all of the hydraulic cylinders.

Figure 8:
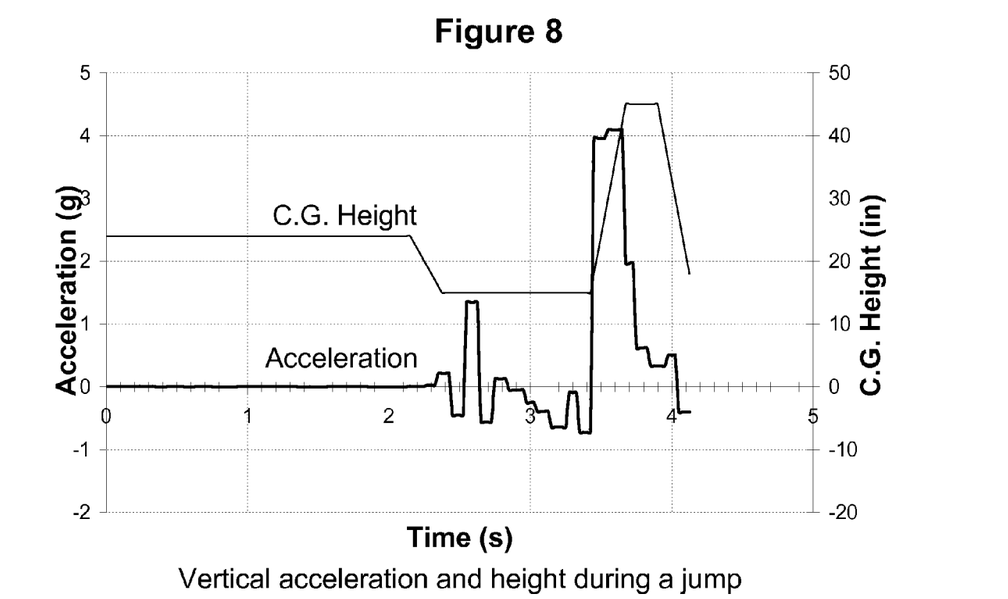
FIG. 8 is a graph of experimental acceleration and height data from a prototype jumping vehicle according to an embodiment of the present invention.

In FIG. 8, experimental data from one of the first jumps of a prototype vehicle are shown. An accelerometer attached to the vehicle shows a maximum vertical acceleration of about 4 gs was obtained at about 3.5 seconds into the jump sequence. The 4 gs was maintained for about 0.5 seconds. When the vehicle jump was actuated, it was standing next to a vertical height measuring stick to allow the height that the vehicle attained to be determined from high speed videotapes. At time t=2 sec, the vehicle is at normal height for translation. Prior to jumping, the vehicle is caused to kneel. The height of the vehicle drops by about 10 inches to attain a height of the vehicle's center of gravity of about 15 inches. The vehicle attains a center of gravity height of about 45 inches at time t=3.7 sec, which is a jump of about 30 inches with respect to the vehicle in the kneeling position and is a jump of about 20 inches with respect to the vehicle in its normal operating mode.

The height data in FIG. 8 were collected from a sequence of video frames. The resolution is determined by the framing rate of the camera which is 30 frames/second. Crudely, by taking a derivative of height with respect to time, the vertical velocity averaged over the ascent is about 7.5 ft/sec.

It should be noted that the vehicle has not been optimized in terms of controlling timing of control valves 68*r* and 68*p* and many other aspects of the hydraulic control system. Furthermore, the prototype vehicle is heavier than its target weight. The data presented herein are preliminary and are not intended to indicate a maximum capability of the present invention.

While the present invention has been described, those skilled in the art will appreciate various changes in form and detail may be made without departing from the intended scope of the present invention as defined in the appended claims.

We claim:

1. A method to operate a vehicle, comprising: actuating a vertical propulsion device, said vertical propulsion device being coupled between a frame of the vehicle and a member of the vehicle in contact with the ground wherein such actuation of said vertical propulsion device causes said member to apply a substantially normal force to the surface such that the resulting acceleration of the vehicle is greater than 2 gs.

2. The method of claim 1 wherein said member is a wheel.

3. The method of claim 2 wherein said vertical propulsion system comprises at least one hydraulic cylinder, the method further comprising: adjusting a valve coupled to said hydraulic cylinder prior to the vehicle impacting the surface so as to control the impact.

4. The method of claim 2 wherein the vehicle also has a horizontal propulsion system coupled between said frame and the said wheel adapted to propel the vehicle along the ground and an electronic controller coupled to said horizontal propulsion system and said vertical propulsion system.

5. The method of claim 1 wherein said member of the vehicle lifts off the ground by a single actuation of said vertical propulsion device.

6. The method of claim 1, the method further comprising:
detecting an obstacle over which the vehicle cannot propel itself if remaining substantially in contact with the ground wherein said actuating the vertical propulsion device is in response to detecting the obstacle.

7. The method of claim 4, further comprising: extending said wheel away from said frame after the vehicle has cleared said obstacle and before the vehicle impacts the ground.

8. The method of claim 1 wherein said vertical propulsion device is one of a hydraulic cylinder and an internal combustion cylinder.

9. The method of claim 1 wherein the vehicle has a plurality of members and at least one vertical propulsion device is coupled between each member and the frame.

10. The method of claim 4, the method further comprising:
detecting an obstacle over which the vehicle cannot propel itself if remaining substantially in contact with the ground wherein said actuating the vertical propulsion device is in response to detecting the obstacle; and
commanding said horizontal propulsion device to attain a predetermined translational velocity prior to said actuation of said vertical propulsion device so that the vehicle clears said obstacle.

11. The method of claim 10 wherein said obstacle is one of a positive obstacle, a negative obstacle, and a non-supportive surface.

12. The method of claim 10, further comprising: controlling said actuation of said vertical propulsion device based on the obstacle to be overcome and a ground surface condition.

13. The method of claim 12 wherein a ground surface condition is detected during a first portion of said actuation based on at least one of force of said actuation, mass of the vehicle, and relative motion between said member and said frame.

14. The method of claim 10, further comprising:
capturing images; and
determining characteristics of the obstacle based on the images.

15. The method of claim 10, further comprising:
pulsing said vertical propulsion device prior to said actuation of the vertical propulsion device; and
estimating a ground surface condition based on a relative motion between said member and said frame as a result of said pulsing.

16. The method of claim 10 wherein ground surface condition is estimated based on signals from sensors coupled to the vehicle.

17. A method to operate a vehicle, comprising:
actuating a vertical propulsion device coupled between a frame of the vehicle and a wheel of the vehicle in contact with the ground wherein such actuation of said vertical propulsion device provides a force on the wheel to cause the wheel to move away from the frame, the force being sufficient to cause the wheels to separate from the ground.

18. The method of claim 17 wherein the vertical propulsion device comprises a vertical propulsion cylinder.

19. The method of claim 18 wherein the vertical propulsion cylinder is a hydraulic cylinder which is hydraulically coupled to an accumulator with a control valve in between the hydraulic cylinder and the accumulator and the actuating the vertical propulsion device comprises opening the control valve.

20. The method of claim 19 wherein the accumulator is also coupled to a high pressure pump adapted to supply high pressure hydraulic fluid to the accumulator.

21. The method of claim 19 wherein the control valve opening allows hydraulic fluid in the accumulator to be applied to the hydraulic cylinder.

22. The method of claim 18 wherein the vertical propulsion cylinder is a hydraulic cylinder which is hydraulically coupled to an accumulator with a first control valve in between the hydraulic cylinder and the accumulator on a first end of the vertical propulsion cylinder and a second control valve in between the hydraulic cylinder on the second end of the cylinder and the actuating the vertical propulsion device comprises opening the first control valve thereby causing the vertical propulsion cylinder to extend, the method further comprising:
closing the first control valve in response to the wheels separating from the ground; and
opening the second control valve in response to the wheels separating from the ground, the opening the second control valve causing the hydraulic cylinder to contract and the wheels to move toward the frame.

23. The method of claim 18 wherein the vertical propulsion device comprises an internal combustion cylinder.

24. A method to operate a vehicle having wheels and a horizontal propulsion system, comprising:
commanding the horizontal propulsion system to apply torque to the wheels to cause the vehicle to translate along a ground surface; and
actuating a hydraulic cylinders coupled between a frame of the vehicle and the wheels of the vehicle wherein the actuation includes transmitting a force on the wheels sufficient to cause the wheels to separate from the ground.

25. The method of claim 24 wherein a hydraulic cylinder is provided at each wheel.

26. The method of claim 24 wherein the hydraulic cylinder is hydraulically coupled to an accumulator with a control valve in between the hydraulic cylinder and the accumulator and the actuating includes opening the control valve.

27. The method of claim 24, further comprising:
determining that an obstacle is in a desired horizontal path of the vehicle wherein the vertical propulsion system is actuated in response to the determination.

28. The method of claim 24 wherein the hydraulic cylinder is hydraulically coupled to a first accumulator with a first control valve in between a first end of the hydraulic cylinder, the hydraulic cylinder is hydraulically coupled to a second accumulator with a second control valve in between a second end of the hydraulic cylinder, and the accumulator and the actuating includes opening the first control valve, further comprising:
determining whether the obstacle is a positive obstacle;
retracting the wheels toward the frame when the obstacle is a positive obstacle wherein the retracting includes closing the first control valve and opening the second control valve.

29. The method of claim 28, further comprising: extending the wheels away from the frame just before returning to the ground.

* * * * *